May 7, 1946. S. Y. WHITE 2,399,703
GAUGE
Original Filed April 18, 1942 5 Sheets-Sheet 2
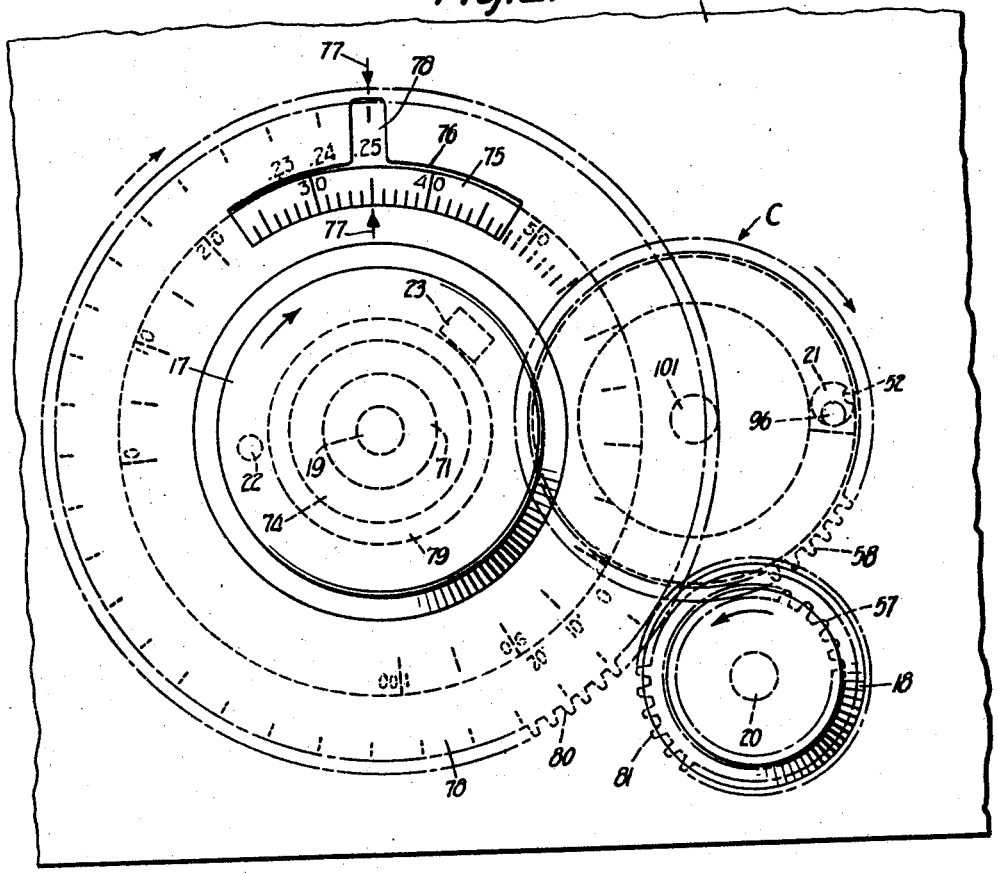
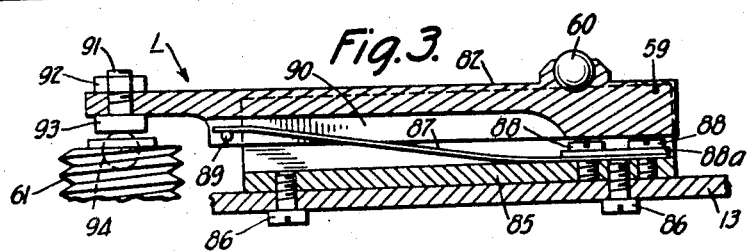
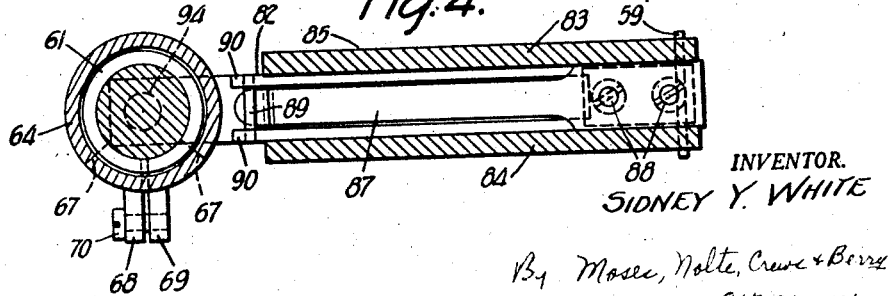
INVENTOR.
SIDNEY Y. WHITE
By Moser, Nolte, Crewe & Berry
Attorneys May 7, 1946.   S. Y. WHITE   2,399,703
GAUGE
Original Filed April 18, 1942   5 Sheets-Sheet 3

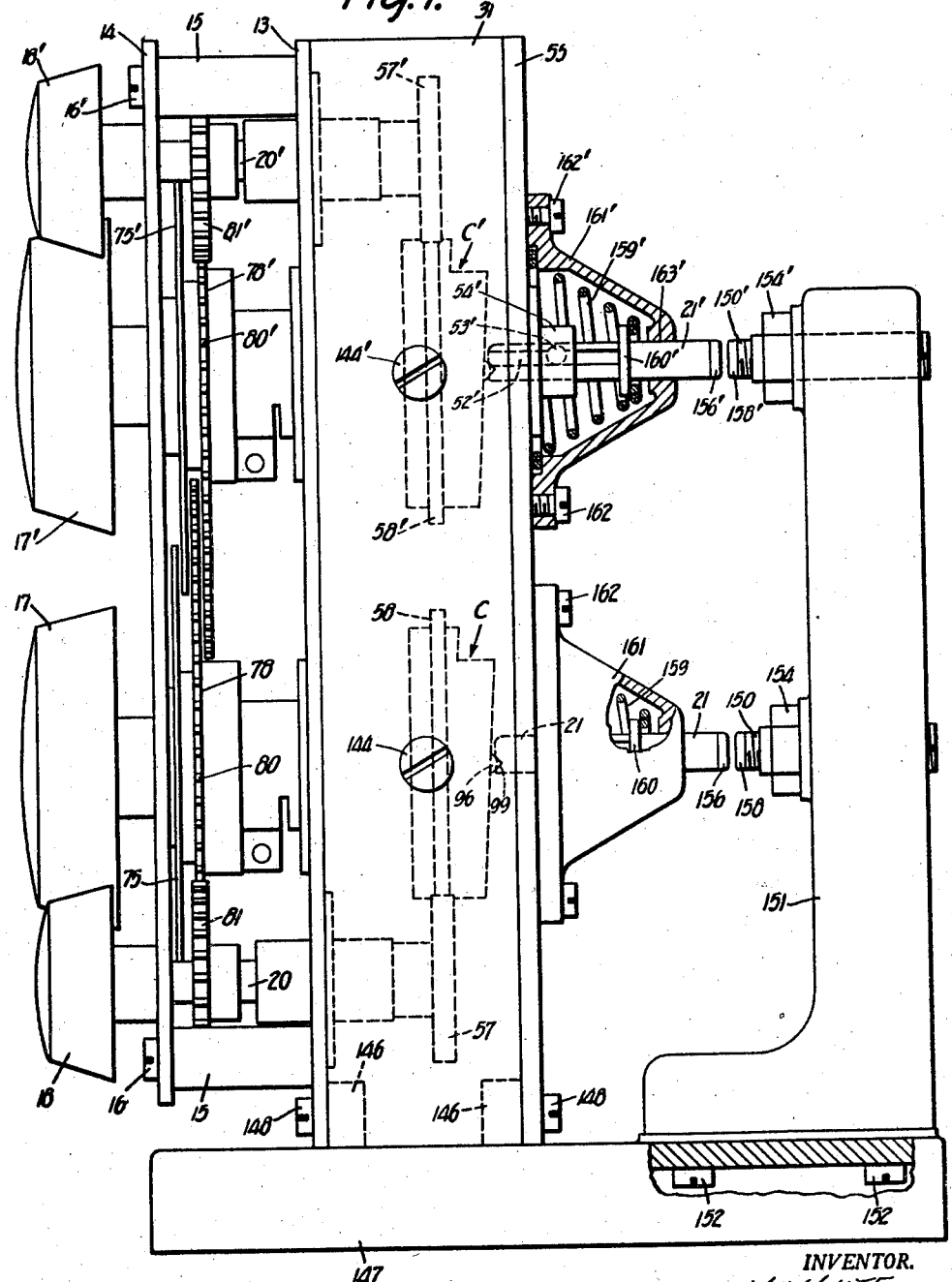

INVENTOR.
SIDNEY Y. WHITE
By Moses, Nolte, Crewe & Berry
Attorneys

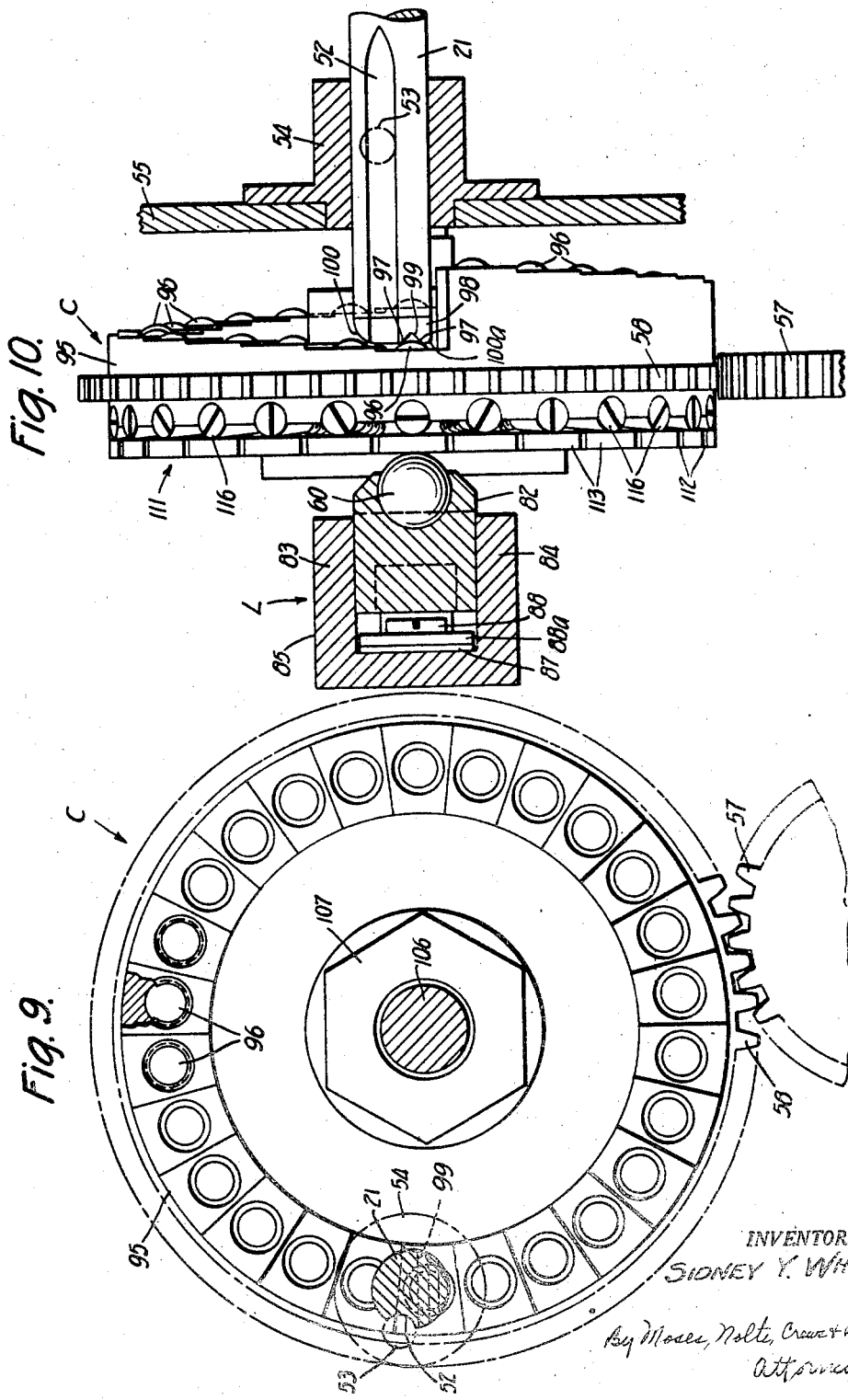

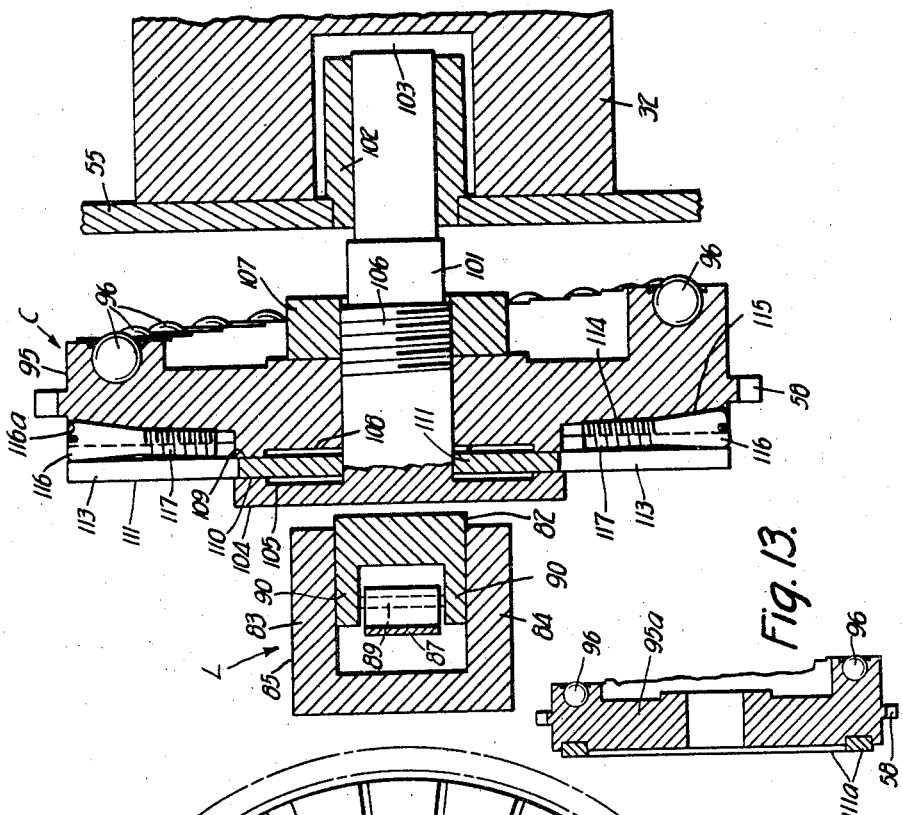

Patented May 7, 1946

2,399,703

UNITED STATES PATENT OFFICE 2,399,703

GAUGE

Sidney Y. White, Wilmette, Ill., assignor to Victor S. Johnson, Chicago, Ill.; Alex Thomson administrator of said Victor S. Johnson, deceased Original application April 18, 1942, Serial No. 439,509. Divided and this application March 10, 1944, Serial No. 525,887

2 Claims. (Cl. 33—165)

The present application is a division of my pending application, Serial No. 439,509, filed April 18, 1942, for Device for adjusting or tuning to close limits.

In my parent application disclosure is made of means for adjusting an operated member to close limits which is of general application and which is illustratively disclosed as embodied in tuning means for tuning a radio circuit and also as embodied in a gauge for gauging the size of articles.

Claims directed broadly to a combination of adjusting means of general application and to a radio tuning means are included in said parent application. Claims directed to a spacing device per se which is advantageously employed in said combination are included in another divisional application Serial No. 525,886, executed and filed concurrently herewith and entitled "Spacing device for adjusting to close limits." The present application is directed to gauging means.

The primary object of the present invention is to provide a gauge comprising relatively fixed and movable members, together with a spacing member which may be quickly and conveniently set to adjust the movable member to any one of a multiplicity of selected mechanically determined datum positions, each representing a known and accurately indicated spacing of the movable member from the fixed member, and an operating member having a limited range of continuous movement, by means of which the movable member may be adjusted micrometically throughout a selected range which depends upon and includes the selected mechanically determined datum setting.

In the illustrative embodiment of the invention, the spacing member is provided with a plurality of steps adapted to impart successive steps of movement to the operated member, which movements are equal to each other, and also equal substantially to the limited range of movement of the operating member. Such relationship is not necessary, however, for the practice of the invention, and it will be understood that for certain purposes the several steps of the spacing member may be unequal and also that the limited amount of movement imparted to the operated member by the actuation of the operating member may be more or less than any one step of movement imparted to the operated member in response to the movement of the spacing member.

It is a further object of the invention to provide in association with each of such operating and spacing members a dial device, the reading of the dial associated with the operating member indicating the setting of the operated member due to its displacement by the operating member and the reading of the dial associated with the spacing member indicating the setting of the operated member due to its displacement by the spacing member. The sum of the readings of the two dials indicates the setting of the operated member resulting from its displacement by both the operating and spacing members in any case where both the latter members are operated. The described dial arrangement provides a very extensive effective dial surface yet at the same time takes up only a small amount of space, is easily read and is inexpensive to manufacture. Further advantages of such a dual dial arrangement will become apparent as its application for indicating the setting of a movable gauge member is described.

Let it be supposed that a gauge is desired capable of measuring accurately to within .0001 inch of thickness throughout a range of .2500 inch, and of affording a reasonably dependable visual approximation to the limit of .00002 inch.

For indicating the setting by means of a dial mechanically connected to the movable member it has been found that dial divisions spaced 0.1 inch apart are easy to read and admit of reasonably accurate visual interpolation to the fineness of one-fifth of a dial division. If each dial division of 0.1 inch corresponds to a gauging increment of .0001 inch, a total of 2500 divisions would be required to cover the total gauging range of .2500 inch and a total dial length of 250 inches would be required. This would require a single dial having a diameter of approximately 80 inches. Such a dial is obviously commercially impractical on account of its large size, weight and cost. It is an important object of the present invention to provide an easy reading dial arrangement constructed upon a principle such, for example, that a pair of dials of only 4 inches in diameter provide the equivalent of approximately 25 ft. of dial length.

In the preferred embodiment of the invention, the two dials are concentrically mounted for rotation about a common axis so that the entire adjusting and indicating unit may be made very compact and light in weight. The movable gauge member is mounted on a push rod which is actuated by a lever from a point near the lever fulcrum, the outer end of the lever being rocked by a coarse pitch screw which carries a dial continuously calibrated over approximately 270° of its periphery from 0 to .0100 inch. The pitch of the screw and the lengths of the lever arms are such that the thrust rod is moved a distance .0100 inch for a rotation of the dial of 270°. The calibrated portion of the dial has 100 equal divisions, each representing a movement of the thrust rod, of .0001 inch. By using a coarse pitch screw and rotating it through less than one revolution, the back lash and inaccuracy resulting from the use of a very fine pitch screw rotated through several revolutions is avoided, it being a very difficult and expensive operation to cut screws of fine pitch without variations in pitch between the different turns.

The initial spacing of the relatively fixed and movable gauging members, which may illustratively be taken as zero, is indicated on a second dial provided immediately adjacent the first and hereinafter described. This initial spacing is controlled and determined by the interposition between the operating member and the thrust rod of a spacer block of known thickness. If the continuous dial is operated from this initial setting of zero throughout its entire scale to a reading of 100, the spacing between the gauging members will have been increased from zero to .0100 inch. If now the continuous dial is returned to zero and a spacer block is substituted whose thickness is less than that of the first by .0100 inch, the push rod will be again caused to occupy exactly the same position to which it was operated by the continuous dial with the first spacer block in effective position. The continuous dial may now be again operated through the one hundred divisions representing its total scale to cover an additional range of .0100 inch, to wit, from .0100 to .0200 inch spacing of the gauging members. By the repeated substitution of spacer blocks, each having a thickness of .0100 inch less than that of its predecessor, the range may be extended again and again.

It is a primary feature of the invention that a series of spacer blocks is provided in the form of a stepped floating cam which is rotatably mounted so that any desired spacer block may be quickly interposed between the lever and the end of the push rod. The second dial and the stepped cam are connected for coordinated operation, the second dial being calibrated to indicate the separation of the gauging members for which the cam operation is responsible. Thus, each step of the cam and the second dial represents a spacing increment of .0100 inch compared with its neighbor, while each division of the first dial represents 1/100 of a single step of the second dial. The combined setting can be very readily read off the two dials, since the reading of the first dial is always a decimal fraction of the unit in which the second dial is calibrated, this unit being .01 inch.

It is a further important feature of the invention that provision is made for adjusting the thickness of each spacer block so that each step of the stepped cam may be made to differ in thickness from its neighbors by exactly .0100 inch. In the illustrative embodiment of the invention, each step of the cam is provided with an adjusting screw so that the thickness of each step may be readily and precisely adjusted to the desired value.

It is a practical and advantageous feature of the invention, that a stepped cam is provided having a hard wearing surface on each step in the region where it engages the push rod. The hard surfaces are desirably provided by setting hard steel balls into the respective steps. By providing a transverse groove in the end of the push rod so that it engages each ball at two spaced points on the curved surface of the ball and by biasing the push rod against the ball by means of a spring, a good detent action is secured which assists in setting each ball in proper position against the push rod. Furthermore, the wear does not all take place at the high point of each ball's surface as would be the case if the end of the push rod were flat and rested against the end or high points only of the balls.

It is an important object of the invention to provide a gauge device in which two adjusting units of the type heretofore described are mounted together to form a "go—no go" gauge for the purpose of testing the sizes of a plurality of similar articles to insure that each comes within an allowable tolerance. Such a gauge has a large field of utility in cases where only a relatively small number of articles are to be tested and yet where the tolerance limits are small so that a high degree of precision in measurement is required.

Further objects of the invention will become apparent as the description thereof proceeds. For a better understanding of the invention, reference is made to the following description, taken in connection with the accompanying drawings, in which:

Fig. 1 is a top plan view of a gauging device embodying features of the invention;

Fig. 2 is a fragmentary front view showing on an enlarged scale a portion of the front panel and indicating dials of the gauging device;

Fig. 3 is a fragmentary horizontal, sectional view showing the operating lever and a portion of the adjusting screw;

Fig. 4 is a vertical sectional view taken on the line 4—4 of Fig. 5 looking in the direction of the arrows and showing the adjusting screw mounting and operating lever;

Fig. 9 is a rear view, partly in section, showing on an enlarged scale the construction of the floating cam and a portion of its driving gear;

Fig. 10 is a vertical sectional view taken on the line 10—10 of Fig. 5, showing on an enlarged scale the operating lever, the floating cam, and the end portion of the thrust rod;

Fig. 11 is a front view taken from the left of Fig. 12, showing on an enlarged scale the construction of the floating cam;

Fig. 12 is a vertical sectional view taken on the line 12—12 of Fig. 11 looking in the direction of the arrows and showing the construction of the floating cam and its operating lever; and Fig. 13 is a fragmentary, vertical, sectional view showing on a reduced scale a modified form of cam construction, the rear face of the cam being partly broken away.

Figure 5:
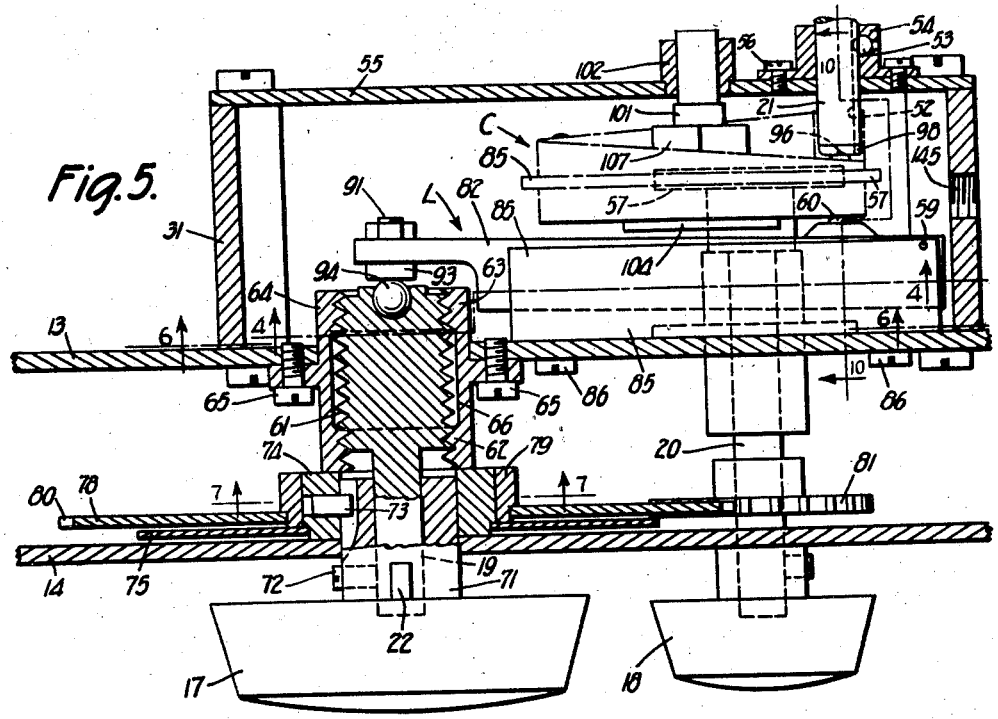
Fig. 5 is a plan view partly in section showing further details of the mechanism illustrated in Fig. 1.

Referring to Fig. 1, the invention is shown in connection with a "go—no go" gauge which desirably comprises duplicate gauge devices adapted to be independently operated to different desired settings. As these gauge devices appear in Fig. 1, the lower one will be described, but since the upper gauge device is a duplicate of the lower one the same reference characters have been applied to corresponding parts with a prime mark added in each instance, and the description of the lower gauging device may be taken as equally applicable to the upper gauging device throughout. The structure comprises a base 147 upon which all of the other structure is supported and mounted. A supporting standard 151 is secured to the base 147 by screws 152 and has threaded through it relatively fixed gauge screws 150 and 150'. Suitable lock nuts 154 and 154' are provided for locking the respective screws 150 and 150' in desired positions. The screws 150 and 150' are provided at the tips with gauge blocks 158 and 158', respectively, of hard material as, for example, carboloy, some hard steel, hard chrome plate or nitrided steel, and the faces ground flat and polished. Opposed to the gauge blocks 158 and 158', respectively, are similar gauge blocks 156 and 156' which are fixed, respectively, upon movable thrust rods 21 and 21' of the lower and upper gauge devices. The remainder of the mechanism to be described is for supporting the thrust rods 21 and 21', for operating them, respectively, toward and from the gauge blocks 158 and 158', and for indicating the settings established by such operation.

The supporting structure comprises an intermediate vertical panel 13 and a front panel 14 which is secured to the intermediate panel 13 by means of tubular sleeves 15 and screws 16. The intermediate panel 13 is secured by screws 148 to lugs 146 provided on the supporting base 147. A rear vertical panel 55 is similarly secured by screws 148 to lugs 146 provided on the base 147. A casing member 31 is interposed between the panels 13 and 55 and secured to them, forming with them a closed housing.

Both lower and upper push rods 21 and 21', as well as the associated means for operating the rods and for indicating the spacing adjustments thereof are carried by the frame structure described.

The lower gauge comprises a pair of control knobs 17 and 18 which are mounted in front of the panel 14, these knobs being secured to a pair of shafts 19 and 20 (see Fig. 5) which extend rearwardly and are adapted to operate the push rod 21 through connections to be hereinafter described. The knob 17 carries a stop pin 22 which is adapted to engage an elongated abutment 23 (see Fig. 2) secured to the panel 13 for the purpose of preventing the rotation of the knob 17 through a full 360°.

The rod 21 is biased forwardly with a force preferably of a pound or more by means of a spring 159 which is a short spiral spring of increasing radius, as shown, the small end of the spring engaging a disc 160 secured to the push rod 21. The large end of the spring 159 is anchored against the rear wall of panel 55 by means of a generally conical casing 161 which is secured to the plate 55 by screws 162. The casing 161 at its rear end is bored, as at 163, to form a supporting hub for the push rod 21. To prevent rotation of the rod 21 during its longitudinal adjustment, it is provided along its top portion near its front end with a groove 52 (see Fig. 5) in which a ball 53 is seated, the ball being carried by bushing 54. The bushing 54 is secured to the rear wall of 55 by screws 56 and serves to support and guide the rod 21 during its longitudinal adjustment.

Figure 6:
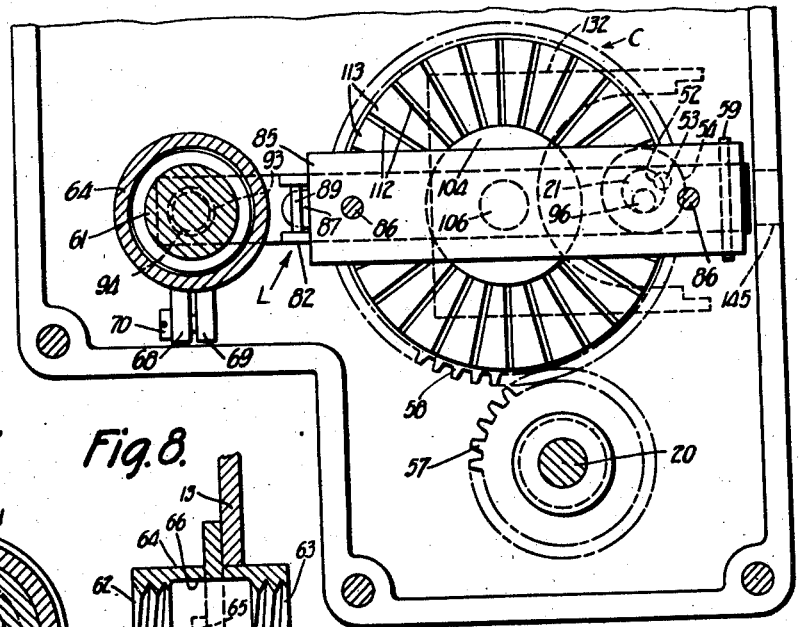
Fig. 6 is a vertical sectional view taken on the line 6—6 of Fig. 5 showing portions of the adjusting device.

Referring to Figs. 1, 5, and 6, the front end of rod 21 engages a floating cam C which is mounted for both rotative and longitudinal movement. The cam is rotated by means of a gear wheel 57 secured to a shaft 20, this gear engaging a toothed gear 58 carried by the peripheral face of the cam C. Rotation of the cam C by the knob 18 and the gear 57 serves to adjust the thrust rod 21 in a manner to be later described. The cam C is also adapted to be moved bodily in the direction of the length of the thrust rod by means of a lever L which is pivoted near its right end on a pin 59. An intermediate point on the lever carries a ball 60 which bears against the front face of the cam C, and the left end of the lever is moved rearwardly by means of a coarse pitch screw 61 formed on the shaft 19.

A detailed description of the screw 61 and the means for indicating its position of adjustment will first be given.

Figure 7:
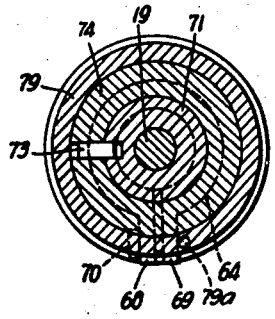
Fig. 7 is a sectional view taken on the line 7—7 of Fig. 5 looking in the direction of the arrows and showing portions of the adjusting screw and the dial mountings.
Figure 8:
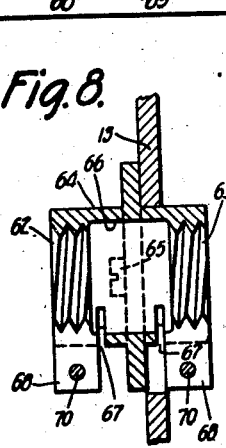
Fig. 8 is a fragmentary, vertical, sectional view showing the supporting nut for the adjusting screw.

Referring to Figs. 5, 7, and 8, the threads of the screw 61 engage corresponding and spaced apart threaded portions 62 and 63 formed on the interior of a supporting nut 64 which is secured to the panel 13 by screws 65. The central portion of the nut 64 is cut away, as indicated at 66, to clear the screw 61 and is also transversely slotted, as indicated at 67, to make the end portions of the nut more flexible. The front and rear ends of the nut are longitudinally slotted and provided with spaced downwardly extending arms 68, 69 which are adapted to be drawn together by screws 70 (see Figs. 4 and 8). By supporting the screw 61 near its ends, vertical or sidewise motion thereof which might move the lever L slightly is prevented, and by adjustment of the screws 70, firm engagement of the threads on the end portions 62—63 of nut 64 with the threads of adjusting screw 61 is assured, it being possible by means of this construction to take up any small amount of looseness or backlash which might exist.

As shown in Fig. 5, the knob 17 has an integrally formed sleeve portion 71 which is secured to shaft 19 by a screw 72, the sleeve being slotted to receive a pin 73 carried by a collar 74, see Fig. 7 also, which therefore rotates with the knob 17. At its front end the collar 74 has secured thereto a thin circular dial 75 which has 100 graduation divisions which extend through 270° as shown in Fig. 2. The dial reading appears in a window opening 76 in panel 14 which is provided with index marks 77 and, in the illustrated embodiment of the invention, each division of dial 75 represents .0001 inch.

Mounted behind and concentric with the dial 75 is a second dial 78 which is secured to a collar 79 rotatable on the collar 74. The graduations on the dial 78 are spaced apart by a substantial distance, as shown in Fig. 2, and also appear in the window openings 76, each graduation representing .0100 inch. For rotating the dial 78 its periphery is provided with gear teeth 80 which engage and are driven by the teeth of a gear 81 secured to the shaft 20, see Figs. 2 and 5. In order to prevent the rotation of the dial 78 through a complete revolution, a stop pin 79a projects from the rear face of the collar 79, see Fig. 7, this pin being adapted to strike against the screw 70 when dial 78 is rotated in one direction and against the depending arm 69 of nut 64 when the dial is rotated in the opposite direction.

Referring to Figs. 3, 4, and 5, the lever L comprises a generally channel shaped pivoted member 82 whose right-hand end is solid as shown in Fig. 3, the pivot pin 59 passing through the solid portion and also through the upper and lower side walls 83, 84 of a channel shaped supporting bracket 85 whose front wall is secured to the panel 13 by the screws 86. The pivot pin 59 is a tight fit for the holes in the pivoted member 82 and the upper and lower channel walls 83—84 to prevent any lost motion in pivoted member 82 as it oscillates. The center portion of the pivoted member 82 is cut away silghtly so as to clear the upper and lower walls 83—84 but the end portions of these walls engage the upper and lower walls of the pivoted member 82 at all times thereby preventing any lost motion in an upward or downward direction of the pivoted member 82 about its pivot pin. The pivoted member 82 is constantly biased toward the adjusting screw 61 by means of an elongated flat spring 87 which is bent into the form shown in Fig. 3 and whose right-hand end is secured to the base of the channel bracket 85 by the screws 88 and thin plate 88a. The other end of the spring bears upon a pin 89 which extends between the upper and lower walls 90 of the channel member 82. Near its right-hand end the channel member 82 carries the ball 60 which engages the cam C while near its left-hand end it is provided with a bore adapted to receive a threaded screw 91 provided with a lock nut 92. The head of screw 91 is formed as a steel button 93 whose front surface bears against a steel ball 94 which is partly embedded in the end of the screw 61. To prevent wear of the button 93 its front face is preferably polished and lapped and hard chrome plated. The pitch of the screw 61 and the proportions of the arms of the lever L are such that when the knob 17 is rotated from the graduation zero to the graduation 100 on dial 75, the ball 60 will move the cam C and push rod 21 rearwardly a distance of exactly .010 inch.

Referring to Figs. 9 to 12 for a detail description of the cam C, this is shown as comprising a generally disc shaped cam member 95 whose rear face is provided with 26 steps of increasing thickness, a steel ball 96 being secured in each step in a manner to be later described. The cam disc 95 is preferably formed as a die casting of an alloy consisting of 90% aluminum, 4% copper and 6% silicon. This alloy is readily adapted to the die casting process and is at the same time very tough, durable and corrosion resistant. The balls 96 are of the same diameter and are disposed at the same radius from the center of rotation of the cam disc 95. The bearing face of each ball is disposed at an elevation of exactly .010 inch from that of the next adjacent ball and the balls are adapted to come successively into engagement with spaced apart points 97 of a button 98 formed of carboloy and which is brazed to the end of the push rod 21. The spaced bearing points 97 are provided by cutting a horizontal V shaped groove 99 in the end of the button 98, which construction results in most of the abrasion and wear on each ball 96, occurring at the high point of the ball which is not a gauging point, the amount of abrasion and wear on the gauging points of the ball being relatively small. The provision of the groove 99 also eliminates minor errors which might otherwise be caused by small variations in the radius of the balls 96 from the center of the cam disc 95. The construction also provides a good detent action, since if the cam disc 95 is not manually adjusted to exactly the correct position, that bearing point 97 which is in engagement with the sloping surface of a ball 96 will ride down such surface under the bias of the spring 159 thereby exerting a camming action on the cam disc 95 which rotates it a slight amount into the correct position. In such position both the bearing points 97 are in engagement with the surface of the ball, as shown in Fig. 10.

The upper face of the button 98 is ground to an arcuate shape as indicated at 100 to provide a better camming action as the next succeeding ball comes into engagement with and slides along such surface during the movement of the push rod rearwardly, thus facilitating the adjustment of the rod 21. The lower face of the button is rounded off slightly, as indicated at 100a, for a similar reason.

The cam disc 95 is secured to the front end of shaft 101 whose rear end is mounted for both rotation and longitudinal movement in a bearing 102 which is secured to the casing wall 55 and which extends into an opening 103 provided in the casting 32, see Fig. 12. The front end of the shaft 101 is formed as a large cylindrical disc 104 whose rear surface is undercut as indicated at 105, Fig. 12. An intermediate portion of the shaft 101 is threaded as at 106 and a cooperating lock nut 107 is provided. The front face of the cam disc 95 is also undercut at 108 to provide an annular face 109 which comes opposite the annular face 110 of disc 104. Mounted between the disc 104 and cam disc 95 is a thin steel disc 111 whose center portion is solid and whose outer portion is provided with a plurality of radial slits 112 which extend from just within the border of the annular faces 109—110 clear to the outer edge of the disc 111 thereby providing a plurality of bendable leaves 113 one of which comes opposite each of the balls 96. Before assembly the steel disc 111 is hardened and the center portion thereof is then annealed to render the material in the central region somewhat flexible so that each leaf 113 may be bent slightly independent of the other leaves, the material throughout the major portion of the leaves remaining hard, however. Cast in the front face of the cam disc 95 opposite each of the balls 96 is a groove the lower portion of which is semi-cylindrical as indicated at 114 (Fig. 11) and whose outer portion is tapered in the shape of a cone as indicated at 115 and having the same taper as the head of an adjusting screw 116. This screw is preferably provided with a hard screw-threaded portion 117 adapted to cut its own threads in the groove 114 and the outer end of the screw is rounded off slightly, as indicated at 116a, so as to prevent the end of the screw from cutting into the metal of cam disc 95. Referring to Figs. 10 and 12, it will be obvious that the distance between the bearing surface of the ball 60 on lever L and the bearing surface of each of the balls 96 of cam C may be adjusted by a slight amount by rotating the screws 116. From Figures 6, 10 and 12 it will be observed that the lever L extends horizontally across the center line of shaft 101 so that the slight sidewise movement of the ball 60 caused by the oscillation of the lever exerts only a radial component of force on the disc 111 so that the oscillation of lever L has no tendency to rotate the cam disc 95 which would in turn displace the push rod 21 by a very small amount but, nevertheless, into an incorrect position.

The method of making the cam forms no part of the present invention, and is fully described in my parent application hereinbefore referred to.

Briefly however, it may be noted that the hard balls are placed in bores of the cam block and simultaneously embedded in the relatively soft metal of the cam block by a press which comprises a multiplicity of plunger pins, each adapted to engage one of the balls and to force it into the cam block to precisely a predetermined depth, the pins being varied in length so that successive balls stand at successive elevations, the increment in elevation being uniform and of precisely determined magnitude. The pins act also to swage the metal of the cam block in around the balls, for retaining the balls firmly in place.

The operation of placing the balls in the openings 141 in cam disc 95 and of pressing the balls into the disc by the press is carried on in an air conditioned room from which dust and dirt particles have been removed. The cam disc 95 with its attached balls 96 is placed in a heated oven where it is heated to a temperature slightly above 400° F. to relieve any internal strains which may have been set up in the metal of the cam disc.

All the balls used in the gauge device are preferably made of polished steel which has been nitrided to harden them and render them corrosion resistant. All the bushings which support the rotary shafts as well as the threaded nut 64 and the hub 54 which supports the push rod 21 are preferably made of bronze. The remaining members of the gauge device (except those above specified as being of different materials), are preferably of Duralumin or other metal which is highly resistant to corrosion as, for example, stainless steel, bronze or Monel metal.

It will be understood that if the gauge blocks are in contact at minimum spacing, both dials should read 0 at that time, but that the dial readings increase as the space between the gauge blocks is increased in response to the forward movement of the push rod 21. If the divisions on the outer dial 78 are, for example, 0, .0100, .0200, .0300, etc., inch, and the inner dial 75 is graduated so that each division is equal to .0001 inch, then the spacing between the gauge blocks 156 and 158 may be readily determined by merely adding together the readings of the two dials. For example, if the outer dial reads .0100, or simply .01, and the reading on the inner dial is 5, then the distance between the gauge blocks is .0100 plus .0005, equals .0105 inch. It will be understood that distances less than .0001 inch may be approximated by setting the inner dial 75 between the two dial divisions, it being readily possible to interpolate by the eye to within one fifth of a dial division.

As has already been indicated, the two gauge devices illustrated are duplicates of one another, save in their specific relations to the common supporting frame structure.

In using the device as a "go—no go" gauge, the knob 17' or both the knobs 17' and 18' are rotated until the spacing between the gauge blocks 156' and 158' is the same as the maximum allowable size of the article under test. The knob 17 or both the knobs 17 and 18 are then rotated until the spacing between the gauge blocks 156 and 158 corresponds to the minimum tolerance limit in the size of the article. Each article under test is then passed down between the gauge blocks of the two units. If the article fails to enter and pass between the blocks 156' and 158', it is too large and is rejected. If the article passes between the gauge blocks 156' and 158' and also passes between the blocks 156 and 158 it is rejected as being too small. If it passes the first pair of gauge blocks but will not pass the second it is accepted as falling within the allowable tolerances. It is a distinct advantage of the device that it may be set for testing articles of any size within its scope of adjustment. Furthermore, any wearing away of the surfaces of the gauge blocks may be readily compensated for by adjusting the screws 150 and 150'.

While I have illustrated my invention as including a stepped cam as a spacing means for effecting different positions for the operated rod or member 27, each of which cam steps as described differs uniformly in thickness from a preceding one of said cam steps, it will be understood that for some purposes these cam portions may have any desired different thicknesses to meet the requirements of different purposes of use, whether the limited amount of movement of the lever or operating member L is equal to the difference between successive thicknesses or not. It will further be understood that my invention is adapted for use where lesser degrees of accuracy of movement are permissible than for the uses described; for example, for the purpose of the relatively general grading or grouping of objects as to size, or the resonant selection of radio stations from a relatively small group of stations such as the broadcast band, the high degree of accuracy described may not be required; in such cases the spacing means or cam C need not be provided with the balls 96, but may be an integral structure made from a single metal block, with a degree of accuracy, in any case, that is commensurate with the intended purpose of the structure.

I have described what I believe to be the best embodiments of my invention. I do not wish, however, to be confined to the embodiments set forth, but what I desire to cover by Letters Patent is set forth in the appended claims.

I claim:

1. In combination, an operating member having a limited amount of finely-graded and continuous movement, an operated member in line with said operating member for operation thereby, means tending to move the operated member toward said operating member, a spacing member having portions of different thicknesses for insertion selectively between said operating member and said operated member, first means for selectively inserting a desired portion of said spacing member between said operating member and said operated member, second means for moving said operating member through said limited movement, and a fixed gauging member in line with said operated member, whereby different spacings of said operated member from said fixed gauging member may be effected by said spacing member and each of said different spacings may be changed by said operating member, the spacing member and operated member having interengaging cam surfaces so that the operated member may be cammed away from the operating member in response to mere rotation of the spacing member.

2. In combination, an operating member having a limited amount of finely-graded and continuous movement, an operated member in line with said operating member for operation thereby, means tending to move the operated member toward said operating member, a spacing member having portions of different thicknesses for insertion selectively between said operating member and said operated member, first means for selectively inserting a desired portion of said spacing member between said operating member and said operated member, second means for moving said operating member through said limited movement, a fixed gauging member in line with said operated member, whereby different spacings of said operated member from said fixed gauging member may be effected by said spacing member and each of said different spacings may be changed by said operating member, a first dial indicating the amount of movement of said operating member, and a second complementary adjacent dial concentric with the first indicating a function of the thickness of the portion of said spacing member inserted between said operating member and said operated member, said dials together indicating the amount of separation of said operated member from said fixed gauging member.

SIDNEY Y. WHITE.